United States Patent
Peterson et al.

(10) Patent No.: US 9,322,433 B1
(45) Date of Patent: Apr. 26, 2016

(54) BEARING ASSEMBLIES, BEARING APPARATUSES, AND METHODS OF USE

(71) Applicant: US SYNTHETIC CORPORATION, Orem, UT (US)

(72) Inventors: S. Barrett Peterson, Orem, UT (US); Jair J. Gonzalez, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 14/843,739

(22) Filed: Sep. 2, 2015

Related U.S. Application Data

(63) Continuation of application No. 14/201,039, filed on Mar. 7, 2014, now Pat. No. 9,151,326.

(51) Int. Cl.
| | |
|---|---|
| *F16C 17/02* | (2006.01) |
| *F16C 33/24* | (2006.01) |
| *F16C 33/04* | (2006.01) |
| *F16C 17/12* | (2006.01) |

(52) U.S. Cl.
CPC .............. *F16C 33/043* (2013.01); *F16C 17/02* (2013.01); *F16C 17/12* (2013.01)

(58) Field of Classification Search
CPC ........ F16C 17/02; F16C 17/03; F16C 17/035; F16C 17/10; F16C 33/24; F16C 2206/04

USPC .......................... 384/111, 117, 122, 302, 309
See application file for complete search history.

(56) References Cited

U.S. PATENT DOCUMENTS

| | | | | |
|---|---|---|---|---|
| 3,795,427 | A | * | 3/1974 | Licht ....................... F16C 17/10 384/103 |
| 4,662,348 | A | | 5/1987 | Hall et al. |
| 5,254,893 | A | * | 10/1993 | Ide .......................... F16C 17/10 310/67 R |
| 7,866,418 | B2 | | 1/2011 | Bertagnolli et al. |
| 7,998,573 | B2 | | 8/2011 | Qian et al. |
| 8,034,136 | B2 | | 10/2011 | Sani |
| 8,236,074 | B1 | | 8/2012 | Bertagnolli et al. |
| 2013/0182980 | A1 | | 7/2013 | Peterson et al. |

OTHER PUBLICATIONS

U.S. Appl. No. 14/201,039, filed Mar. 7, 2014, Peterson et al.
U.S. Appl. No. 14/201,039, Mar. 13, 2015, Office Action.
U.S. Appl. No. 14/201,039, May 28, 2015, Notice of Allowance.

\* cited by examiner

*Primary Examiner* — Phillip A Johnson
(74) *Attorney, Agent, or Firm* — Dorsey & Whitney LLP

(57) ABSTRACT

Embodiments of the invention relate to bearing assemblies, bearing apparatuses, and methods of assembling and operating such bearing assemblies and apparatuses. For instance, first bearing assembly and/or the second bearing assembly may include one or more tapered sections, which may facilitate entry of the first bearing assembly into the second bearing assembly.

20 Claims, 14 Drawing Sheets

BEARING ASSEMBLIES, BEARING APPARATUSES, AND METHODS OF USE

CROSS-REFERENCE TO RELATED APPLICATIONS

This application is a continuation of U.S. application Ser. No. 14/201,039 filed on 7 Mar. 2014, the disclosure of which is incorporated herein, in its entirety, by this reference.

BACKGROUND

Bearing assemblies and apparatuses may commonly be used to facilitate rotation of a machine element or component relative to another machine element or component. For instance, a radial bearing apparatus may facilitate rotation of a shaft relative to a housing. In particular, the radial bearing apparatus may allow the shaft to rotate relative to the housing while limiting or preventing lateral movement of the shaft. Furthermore, in some instances the shaft also may be restricted from axial movement by one or more thrust-bearing assemblies. In any case, the bearing assemblies and/or bearing apparatuses may facilitate rotation of the shaft, while preventing or limiting non-rotational movement thereof relative to the housing.

A typical bearing apparatus includes a stator that does not rotate and a rotor that is attached to the shaft and rotates with the shaft. The operational lifetime of the bearing apparatuses often determines the useful life of the machine.

Therefore, manufacturers and users of machines that include rotating elements or components continue to seek improved bearing apparatuses to extend the useful life of such bearing apparatuses.

SUMMARY

Embodiments of the invention relate to bearing assemblies, bearing apparatuses, agitator systems including such bearing assemblies and apparatuses, and methods of assembling and operating such bearing assemblies and apparatuses. In an embodiment, a bearing assembly includes a support structure having a bearing section and a tapered section connected to the bearing section. The tapered section includes a substantially conically shaped outer surface. A plurality of first superhard bearing elements are secured to the bearing section of the support structure, with the plurality of first superhard bearing elements being distributed about an axis to form a radial bearing surface. Each of the plurality of first superhard bearing elements includes a superhard material having a first superhard bearing surface. A plurality of second bearing elements are secured to one or more of the bearing section or the tapered section of the support structure.

In an embodiment, a bearing apparatus is disclosed. The bearing apparatus includes a first bearing assembly including a support structure, a plurality of first superhard bearing elements secured to the support structure and each having a first superhard bearing surface, and a plurality of second superhard bearing elements secured to the support structure. Each of the plurality of second superhard bearing elements includes a beveled surface. The plurality of first superhard bearing elements and the plurality of second superhard bearing elements at least partially define an opening in the first bearing assembly. The plurality of second superhard bearing elements at least partially form a first tapered section of the first bearing assembly. The bearing apparatus further includes a second bearing assembly insertable into the first bearing assembly. The second bearing assembly includes a plurality of third superhard bearing elements each having a third superhard bearing surface sized and configured to rotatably engage the first superhard bearing surfaces.

In an embodiment, an agitator system is disclosed. The agitator system includes a container sized and configured to contain a medium, a first bearing assembly secured to a bottom of the container, a shaft including one or more blades attached thereto, and a second bearing assembly secured to the shaft and insertable into the first bearing assembly. The first bearing assembly includes a plurality of first superhard bearing elements each having a first superhard bearing surface, and the first bearing surfaces defining an opening in the first bearing assembly. The second bearing assembly includes a support structure having a tapered section, and a plurality of second superhard bearing elements secured to the support structure and each having a second superhard bearing surface configured to rotatably engage the first superhard bearing surfaces. The tapered section is sized and configured to substantially align a generally center axis of the second bearing assembly with a generally center of the first bearing assembly.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to bearing assemblies, bearing apparatuses, agitator systems including such bearing assemblies and apparatuses, and methods of assembling and operating such bearing assemblies and apparatuses. In particular, an embodiment may include a first radial bearing assembly insertable into a second radial bearing assembly. For instance, the first bearing assembly may be a rotor and the second bearing assembly may be a stator, or vice versa. Furthermore, the first bearing assembly and/or the second bearing assembly may include one or more tapered sections (e.g., lead-in sections), which may facilitate entry of the first bearing assembly into the second bearing assembly.

An embodiment may include a tapered section on the first and/or second bearing assemblies. For instance, the first and/or second bearing assemblies may include a beveled or tapered section, which may facilitate alignment or centering of the first and second bearing assemblies. Particularly, one or more tapered section may guide the corresponding first and/or second bearing assemblies to a concentric position relative to each other. Accordingly, in some embodiments, one or more tapered section may reduce or eliminate damaging the first and/or second assemblies during assembly of the bearing apparatus comprising thereof.

Also, in an embodiment, the first and/or second bearing assemblies may include superhard bearing elements. As used herein, a "superhard bearing element" is a bearing element including a bearing surface that is made from a material exhibiting a hardness that is at least as hard as tungsten carbide. In any of the embodiments disclosed herein, the superhard bearing elements may include one or more superhard materials, such as polycrystalline diamond, polycrystalline cubic boron nitride, silicon carbide, tungsten carbide, or any combination of the foregoing superhard materials.

In some embodiments, any of the respective support structures also may include a tapered section that may at least partially form the lead-in section of the first and/or second bearing assemblies. Moreover, in an embodiment, the superhard bearing elements may protrude outward from corresponding support structures of the first and/or second bearing assemblies. Accordingly, in some embodiments, the superhard bearing elements may include and/or at least partially form the lead-in section of the first and/or section bearing assemblies. For instance, a taper or bevel may extend from a bearing surface of any one of the superhard bearing elements toward the support structure (e.g., toward a tapered section or bearing section of the support structure). For example, the tapered section of the support structure may include a bevel of the superhard bearing elements.

Figure 1A:
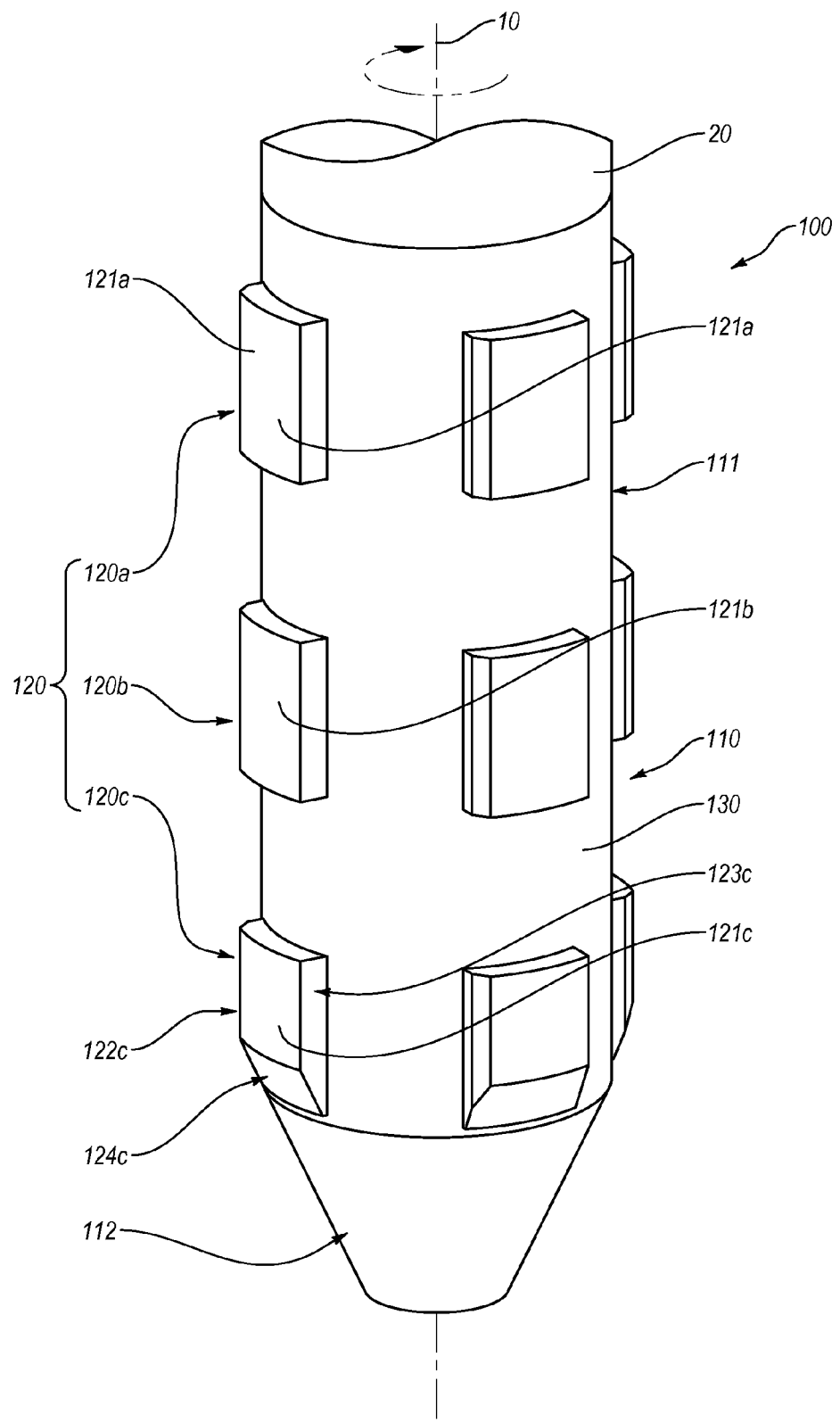
FIG. 1A is an isometric view of a first bearing assembly connected to a shaft according to an embodiment of the invention.

FIG. 1A illustrates a first bearing assembly 100 according to an embodiment. The first bearing assembly 100 includes a support structure 110 and a plurality of superhard bearing elements 120 (e.g., superhard bearing elements 120a-120c) secured to and/or within the support structure 110. Moreover, the first bearing assembly 100 may attach or connect to a shaft 20. In particular, rotation of the shaft 20 may produce a corresponding rotation of the first bearing assembly 100 (e.g., the shaft 20 and the first bearing assembly 100 may rotate approximately concentrically). It should be appreciated that the terms "first" and "second" bearing assembly are used for descriptive purposes only and are not intended to specifically identify either bearing assembly as a rotor, stator, or a particular type of a bearing assembly. Hence, the terms "first" and "second" may be used interchangeably.

As noted above, in some instances, at least some of the superhard bearing elements 120 may at least partially form a tapered section of the first bearing assembly 100. As such, in some instances, one or more of the superhard bearing elements 120 may have different shapes and/or configurations than other superhard bearing elements 120. For example, superhard bearing elements 120a, 120b may have an approximately rectangular shape, while superhard bearing elements 120c may have an approximately rectangular shape with a bevel on one side thereof.

In any event, however, each of the superhard bearing elements 120 may include a bearing surface that may engage one or more bearing surfaces of the second bearing assembly. For instance, the superhard bearing elements 120c may include bearing surfaces 121c. Similarly, the superhard bearing elements 120a, 120b may include respective bearing surfaces 121a, 121b. In the illustrated embodiment, the first bearing assembly 100 is a radial bearing assembly. Accordingly, at least one, some, or each of the superhard bearing elements 120 may have a convex bearing surface (e.g., curved to form an exterior surface of a portion of an imaginary cylinder), such as the bearing surfaces 121a, 121b, 121c.

As described below in further detail, the bearing surfaces of the opposing, second bearing assembly may be configured to engage the bearing surfaces 121a, 121b, 121c. For example, at least one, some, or each of the bearing surfaces of the second bearing assembly may have a concave configuration (e.g., curved to form an interior surface of a portion of an imaginary cylinder). In any event, the superhard bearing elements 120 may rotationally engage the superhard bearing elements of the second bearing assembly in a manner that facilitates rotation of the first bearing assembly 100 (e.g., about axis 10) relative to and/or within the second bearing assembly, while limiting or preventing lateral movement thereof The first bearing assembly 100 may include the superhard bearing elements 120 arranged in any suitable manner on and/or about the support structure 110. For example, the superhard bearing elements 120 may form multiple columns. One embodiment may include four columns of the superhard bearing elements 120 positioned circumferentially about the axis 10. Embodiments also may include more or fewer than four columns (e.g., each column spaced at 90 degrees apart) of the superhard bearing elements 120. Furthermore, spacing between the columns may vary from one embodiment to the next, and may depend on the number of columns, width of the superhard bearing elements 120, as well as relative position of the superhard bearing elements 120 in the adjacent columns.

In addition, the columns may be axially aligned with one another (i.e., the superhard bearing elements 120 in one column may be aligned with the superhard bearing elements 120 and the adjacent column). Alternatively, the columns may be offset (e.g., circumferentially and/or radially offset) from one another, such that the superhard bearing elements 120 in one column are offset from the superhard bearing elements 120 in an adjacent column. Also, the columns of the superhard bearing elements 120 may be approximately oriented axially along the length of the support structure 110 or at selected distances along the axis 10. Accordingly, rotation of the support structure 110 about a center axis thereof and/or about the axis 10 may produce rotation of the columns of the superhard bearing elements 120 about the axis 10.

In additional or alternative embodiments, the column of the superhard bearing elements 120 may be oriented and/or positioned in any desired configuration relative to the length of the support structure 110 (e.g., the column of the superhard bearing elements 120 may approximately form a spiral or helix about an outer surface 130 of the support structure 110). Also, the first bearing assembly 100 may include any number of the superhard bearing elements 120 positioned along the length thereof. For instance, the superhard bearing elements 120 may form rows that span about the support structure 110 (e.g., about the circumference of the support structure 110). In any event, the bearing surfaces 121*a*, 121*b*, 121*c* may rotate about the axis 10 in a manner that the path thereof approximates a cylindrical surface.

As the first bearing assembly 100 rotates about the axis 10, one side of the superhard bearing elements 120 will be a front or a leading side, while another side may be a trailing side. For example, the superhard bearing elements 120*a* may include a leading side 122*c* and a trailing side 123*c*. In at least one embodiment, one, some, or all of the superhard bearing elements 120 may include a chamfer between the bearing surfaces and the leading sides (e.g., on the superhard bearing elements 120*c*, the chamfer may extend between the bearing surface 121*c* and the leading side 122*c*). Alternatively, the interface between the leading side and the bearing surface of one, some, or all of the superhard bearing elements 120 may be a sharp edge.

Also, as noted above, the superhard bearing elements 120 also may have a beveled surface, which may facilitate assembly of the bearing apparatus described below. In an embodiment, the superhard bearing elements 120*c* may include a beveled surfaces 124*c*. In some embodiments, the beveled surfaces 124*c* may be approximately perpendicular relative to the leading side 122*c*. Alternatively, however, the beveled surface 124*c* may form any suitable angle with the leading side 122*c*. The beveled surfaces 124*c* also may have a partially substantially cylindrical or convex shape, similar to the shape of the bearing surface 121*c*. For instance, the beveled surfaces 124*c* may be shaped as a portion of a substantially cylindrical cone. Additionally, the beveled surfaces 124*c* may form an obtuse angle relative to the 121*c*. One, some, or all of the beveled surfaces 124*c* of the superhard bearing elements 120*c* may form a portion of or may lie on an imaginary conical surface.

In the illustrated embodiment, the superhard bearing elements 120 have chamfered corners or edges on leading edges or along leading sides 122*c* of the bearing surfaces. In some operating conditions, such sharp corners or edges may result in premature chipping or cracking of the superhard bearing elements 120 and of the bearing surfaces in particular. It should be appreciated, however, that embodiments also may include the superhard bearing elements 120 may have chamfers, radii, or other features that may reduce or eliminate chipping of the superhard bearing elements 120. For example, each, some, or all of the superhard bearing elements 120 may have a chamfer or a radius that span about a perimeter of the respective bearing surfaces.

In some embodiments, the beveled surface 124*c* may be approximately perpendicular relative to the leading side 122*c*. Alternatively, however, the beveled surface 124*c* may form any suitable angle with the leading side 122*c*. The beveled surface 124*c* also may have a partially substantially cylindrical or convex shape, similar to the shape of the bearing surface 121*c*. For instance, the beveled surface 124*c* may be shaped as a portion of a substantially cylindrical cone. Additionally, the beveled surface 124*c* may form an obtuse angle relative to the 121*c*.

Furthermore, the support structure 110 may include a bearing section 111 and a tapered section 112, which may be located at a distal end thereof. The tapered section 112 may have a substantially conical shape. In particular, the configuration of the tapered section 112 may vary from one embodiment to the next and may depend on the size of the support structure 110, length of the support structure 110, as well as other parameters or factors. In one embodiment, the tapered section 112 may have an included angle $\theta$ of approximately 30° to approximately 60°.

In an embodiment, at a proximal end thereof, the bearing section 111 may mount or attach to a shaft 20. At the distal end, the bearing section 111 may attach to or may be integrated with the tapered section 112. For example, the distal end of the first bearing assembly 100 may be inserted into the second bearing assembly. As such, the tapered section 112 as well as the beveled surface 124*c* of the superhard bearing elements 120*c* may facilitate entry of the first bearing assembly 100 into the second bearing assembly and may assist in substantially concentric alignment thereof.

More specifically, as noted above, the superhard bearing elements 120 may be secured to the bearing section 111 of the support structure 110. In some embodiments, the tapered section 112 may be free of the superhard bearing elements 120. Alternatively, as described in more detail below, the tapered section 112 may include at least one or a plurality of superhard bearing elements. In any event, at least a portion of in the superhard bearing elements 120 and/or the tapered section 112 may facilitate assembly of the bearing apparatus (i.e., entry of the first bearing assembly 100 into the second bearing assembly).

Figure 1B:
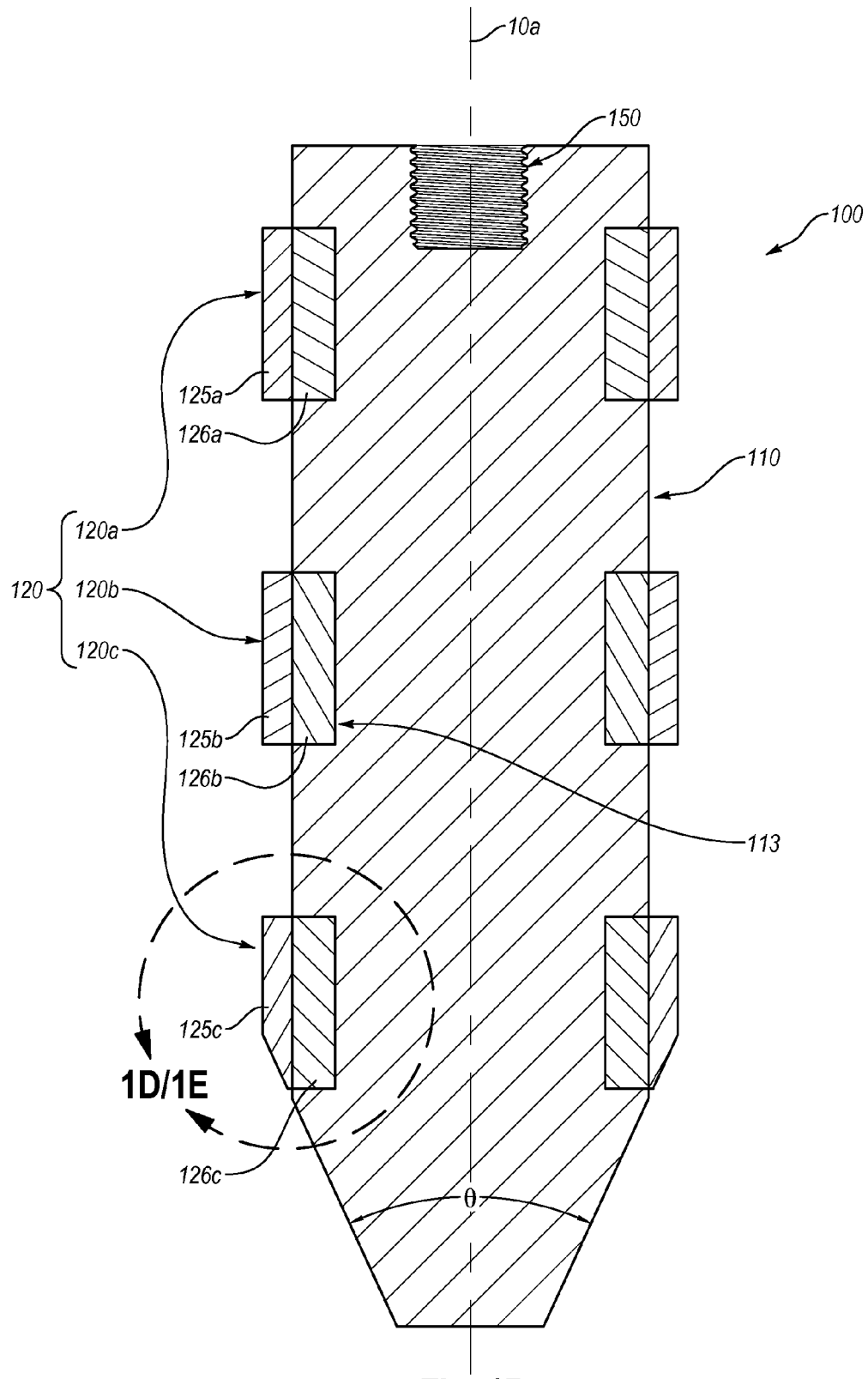
FIG. 1B is a cross-sectional view of the first bearing assembly of FIG. 1A.

In some embodiments, as illustrated in FIG. 1B, the superhard bearing elements 120 and any superhard bearing element disclosed herein may have respective superhard tables 125*a*-125*c* and substrates 126*a*-126*c*. For example, the superhard tables 125*a*-125*c* may comprise polycrystalline diamond and the substrate substrates 126*a*-126*c* may comprise cobalt-cemented tungsten carbide. Other carbide materials may be used with tungsten carbide or as an alternative, such as chromium carbide, tantalum carbide, vanadium carbide, titanium carbide, or combinations thereof cemented with iron, nickel, cobalt, or alloys thereof. Furthermore, in any of the embodiments disclosed herein, the polycrystalline diamond table may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials and/or structures from which the superhard bearing elements disclosed herein may be made are disclosed in U.S. Pat. Nos. 7,866,418; 7,998,573; 8,034,136; and 8,236,074; the disclosure of each of the foregoing patents is incorporated herein, in its entirety, by this reference.

The diamond particles that may be used to fabricate any of the superhard tables 125*a*-125*c* in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 70 μm, 60 μm, 50 μm, 40 μm, 30 μm, 20 μm, 15 μm, 12 μm, 10 μm, 8 μm) and another portion exhibiting at least one relatively smaller size (e.g., 15 μm, 12 μm, 10 μm, 8 μm, 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In another embodiment, the diamond particles may include a portion exhibiting the relatively larger size between about 15 μm and about 50 μm and another portion exhibiting the relatively smaller size between about 5 μm and about 15 μm. In another embodiment, the relatively larger size diamond particles may have a ratio to the relatively smaller size diamond particles of at least 1.5. In some embodiments, the diamond particles may comprise three or more different sizes (e.g., one relatively larger size and two or more relatively smaller sizes), without limitation. The resulting polycrystalline diamond formed from HPHT sintering the aforementioned diamond particles may also exhibit the same or similar diamond grain size distributions and/or sizes as the aforementioned diamond particle distributions and particle sizes. Additionally, in any of the embodiments disclosed herein, the superhard bearing elements may be free-standing (e.g., substrateless) and optionally may be at least partially or fully leached to remove a metal-solvent catalyst initially used to sinter the polycrystalline diamond body.

As described above, in some embodiments, the superhard bearing elements 120 may be secured to or integrated with the support structure 110. For example, the support structure 110 may include recesses 113 (FIG. 1B), and the superhard bearing elements 120 may be secured within the recesses 113. In an embodiment, the substrates of the superhard bearing elements 120 may be secured within the recesses 113. Alternatively, as mentioned above, some or all of the superhard bearing elements 120 may be substrateless. As such, corresponding superhard tables of the superhard bearing elements 120 may be secured within the recesses 113. Furthermore, a portion of one, some, or all of the substrates may protrude out of the support structure 110. Alternatively, one, some, or all of the substrates may be located completely inside the support structure 110, such that only the respective superhard tables 125a-125c protrude out of the support structure 110. Also, in some embodiments, the bearing surfaces of the superhard bearing elements 120 (as formed or defined by the superhard table 125a-125c) may be flush with the support structure 110.

The superhard bearing elements 120 may be secured to the support structure 110 in any number of suitable ways that may vary from one embodiment to the next. For instance, the superhard bearing elements 120 may be at least partially secured within respective recesses 113 in the support structure 110 by brazing, press-fitting, threadedly attaching, fastening with a fastener, combinations of the foregoing, or another suitable technique. In any case, the superhard bearing elements 120 may be removably or non-removably secured to the support structure 110, such as to remain attached to the support structure 110 during the operation of the first bearing assembly 100.

Figure 4:
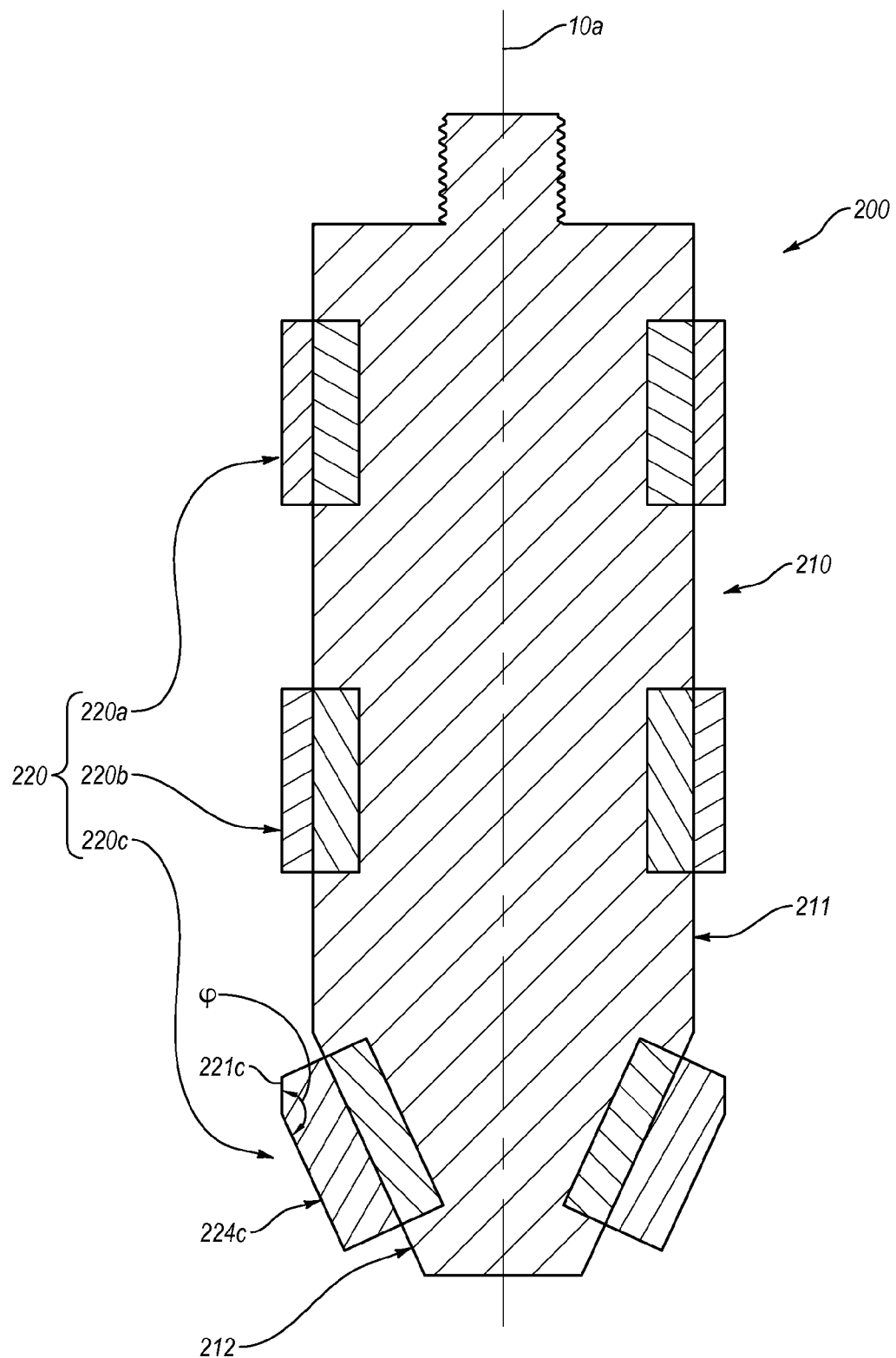
FIG. 4 is a cross-sectional view of the first bearing assembly according to yet another embodiment of the invention.

As mentioned above, the first bearing assembly 100 may be attached to a shaft. For example, the first bearing assembly 100 may include an opening 150 that may accept a corresponding portion of the shaft and may align the first bearing assembly 100 relative to the shaft (e.g., may align the shaft concentrically with the first bearing assembly 100). In some embodiments, the opening 150 may include a female thread, while the shaft may include a corresponding male thread, which may engage and mate with the female thread, thereby securing together the first bearing assembly 100 and the shaft. Alternatively, the shaft may include female thread that may engage and couple with a male-threaded protrusion included in the first bearing assembly (e.g., as shown in FIG. 4).

Figure 1C:
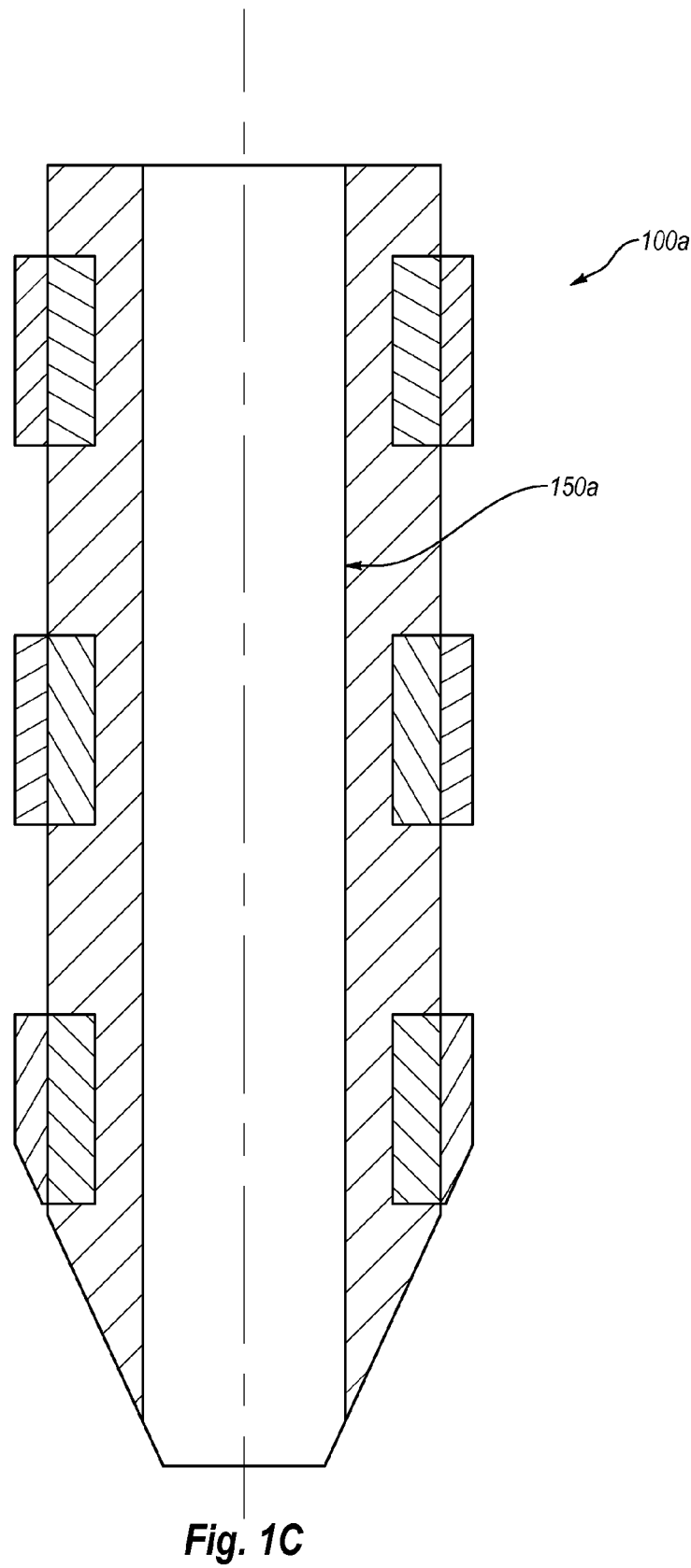
FIG. 1C is a cross-sectional view of first bearing assembly according to another embodiment of the invention.

Moreover, in some embodiments, the first bearing assembly may include a hole that may accept or slip over a shaft. For instance, the shaft may be press-fit in the hole. One embodiment includes a first bearing assembly 100a that includes a through hole 150a, as shown in FIG. 1C. Except as otherwise described herein, the first bearing assembly 100a and its respective materials, elements, or components may be similar to or the same as the first bearing assembly 100 (FIGS. 1A-1B) and their respective materials, elements, and components. In some embodiments, the shaft may be cooled and/or at least a portion of the first bearing assembly 100a may be heated to facilitate press-fit of the shaft in the hole 150a.

Furthermore, it should be also appreciated, however, that the hole may have any suitable depth in the first bearing assembly. Additionally, the through hole 150a may facilitate fastening the first bearing assembly 100a to the shaft. For example, the shaft may include a female thread on end thereof, which may be accessible through the distal end of the through hole 150a. Hence, the first bearing assembly 100a may be fastened to the shaft with a washer that may be hold the first bearing assembly 100a on the shaft with an aid of a screw threaded into the female thread of the shaft.

Figure 1D:
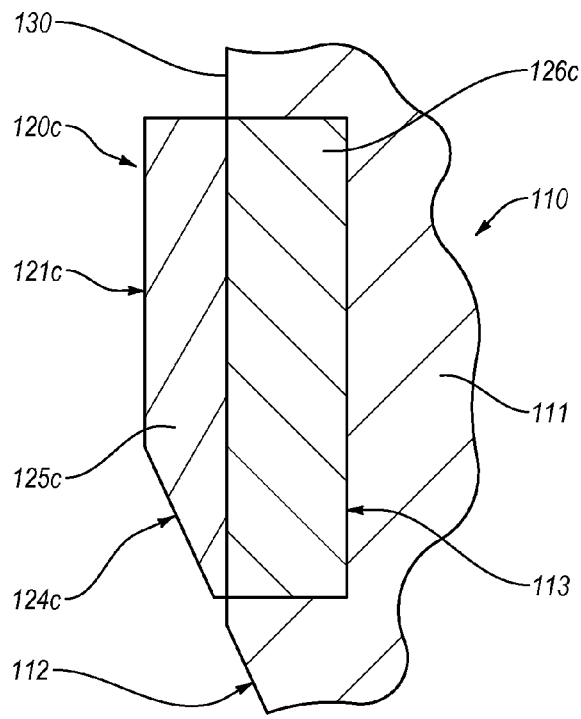
FIG. 1D is an enlarged partial cross-sectional view of a bearing element attached to a support structure of a first bearing assembly according to an embodiment of the invention.

As mentioned above, the substrate may be at least partially or entirely contained within the support structure 110 (e.g., a portion of the substrate may protrude out of the support structure 110). FIG. 1D illustrates one embodiment that includes the superhard bearing element 120c having the substrate 126c positioned radially within the recess 113 in the bearing section 111 of the support structure 110. In other words, only the superhard table 125c may protrude above the radial outer surface 130 of the bearing section 111 of the support structure 110, while the substrate 126c may be positioned radially within the recesses 113. In addition, the beveled surface 124c may extend between the bearing surface 121c and a peripheral surface or edge of the superhard bearing element 120c. As such, a lower edge of the beveled surface 124c may be spaced away from the outer surface 130, such that there is a gap between the tapered section 112 and the beveled surface 124c.

In an embodiment, however, the beveled surface 124c may extend between the bearing surface 121c and the outer surface 130. For example, the superhard bearing elements 120c may be positioned on the bearing section 111 such that the beveled surface 124c forms a substantially uninterrupted portion of the tapered section 112.

Figure 1E:
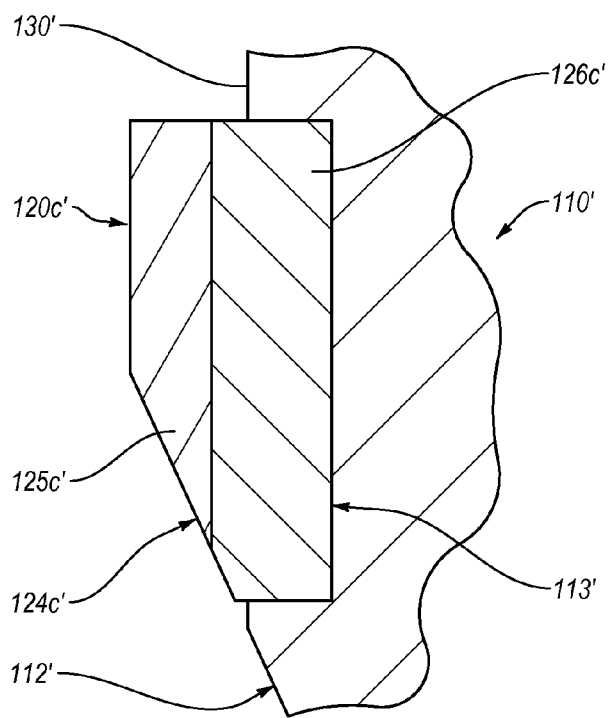
FIG. 1E is an enlarged partial cross-sectional view of a bearing element attached to a support structure of a first bearing assembly according to another embodiment of the invention.

In additional or alternative embodiments, each, some, or all of the superhard bearing elements may include the substrate that protrudes radially beyond the support structure (i.e., protrudes beyond the outer surface of the support structure). FIG. 1E illustrates an embodiment that include a superhard bearing element 120c' secured within the recess 113' of the support structure 110'. Except as otherwise described herein, the superhard bearing element 120c' and the support structure 110' and their respective materials, elements, or components may be similar to or the same as the superhard bearing element 120c and/or the support structure 110 (FIG. 1D) and their respective materials, elements, and components. Generally, the recess 113' may have any suitable depth within the support structure 110', which may vary from one embodiment to the next. In some embodiments, the superhard bearing element 120c' may include the substrate 126c' that protrudes out of the recess 113' and above the outer surface 130' of the support structure 110'.

Furthermore, in some instances, superhard bearing element 120c' may include beveled surface 124c' that may pass through a superhard table 125c' as well as through the substrate 126c'. In other words, the superhard table 125c' as well as substrate 126c' may together the form the beveled surface 124c'. In some embodiments, the beveled surface 124c' may be included in tapered section 112' of the support structure 110'. In one embodiment, there may be a gap between the beveled surface 124c' and the tapered section 112'. Alternatively, however, the tapered section 112' may be substantially continuous and may have not gap between the beveled surface 124c' and a distal end of the support structure 110'.

Figure 2:
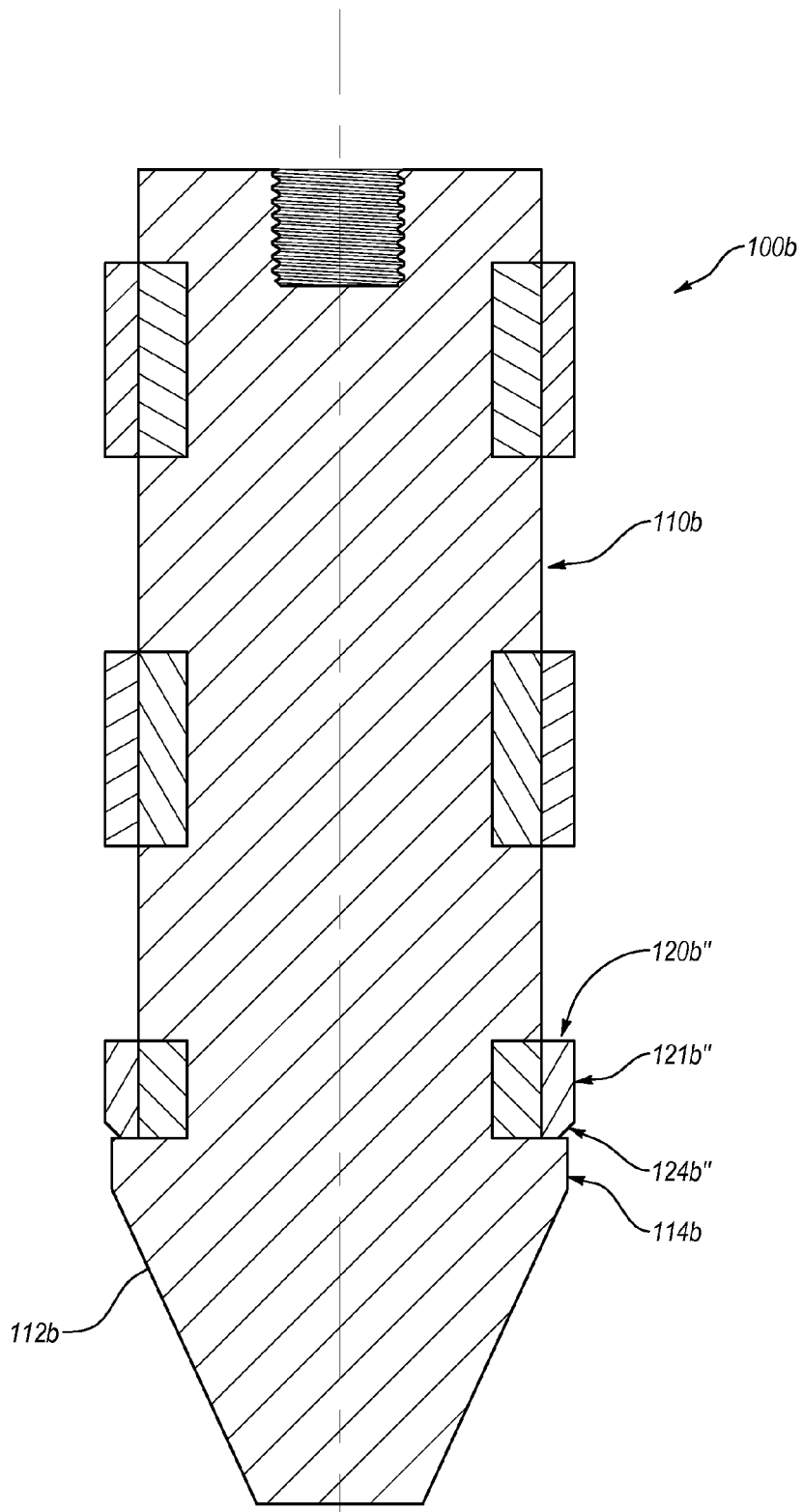
FIG. 2 is a cross-sectional view of first bearing assembly according to an embodiment of the invention.

In additional or alternative embodiments, the tapered support region of the support structure may extend from a cylindrical section disposed between the tapered section of the superhard elements by and the tapered support region. For example, FIG. 2 illustrates a first bearing assembly 100b that has a support structure 110b, which includes a tapered section 112b. Except as otherwise described herein, the first bearing assembly 100b and its respective materials, elements, or components may be similar to or the same as any of the first bearing assemblies 100, 100a (FIGS. 1A-1C) and their respective materials, elements, and components.

In some embodiments, the tapered section 112b of the first bearing assembly 100b may transition to an approximately cylindrical section 114b. In at least one embodiment, the cylindrical section 114b may have a larger diameter than at least another portion of the support structure 110b. In any event, the cylindrical section 114b may be located between the tapered section 112b" and superhard bearing elements 120b". As noted above, one, some, or all of the superhard bearing elements 120b" may include a beveled surface 124b". For instance, the beveled surface 124b" may extend from a bearing surface 121b" toward and/or to the cylindrical section 114b.

In one or more embodiments, the cylindrical section 114b may have a smaller diameter than the diameter formed or defined by the bearing surfaces 121b" and/or by other bearing surfaces of the bearing elements mounted on the support structure 110b. In other words, the outer surface of the cylindrical section 114b may be spaced apart from bearing surfaces of an opposing (e.g., second) bearing assembly. Alternatively, however, diameter of the cylindrical section 114b may be approximately the same or similar to the diameter formed by the bearing surfaces 121b".

Moreover, in some examples, the first bearing assembly 100b may include notches formed by and between the beveled surfaces 124b" and a shoulder of the cylindrical section 114b. Embodiments also may include the bearing elements 120b" abutting the cylindrical section 114b in a manner that minimizes or eliminate any notches and/or gaps therebetween. In any case, the tapered section 112b" and the beveled surfaces 124b" may facilitate assembly and/or operation of the first bearing assembly 100b and an opposing bearing assembly, such as a second bearing assembly described herein.

Figure 3:
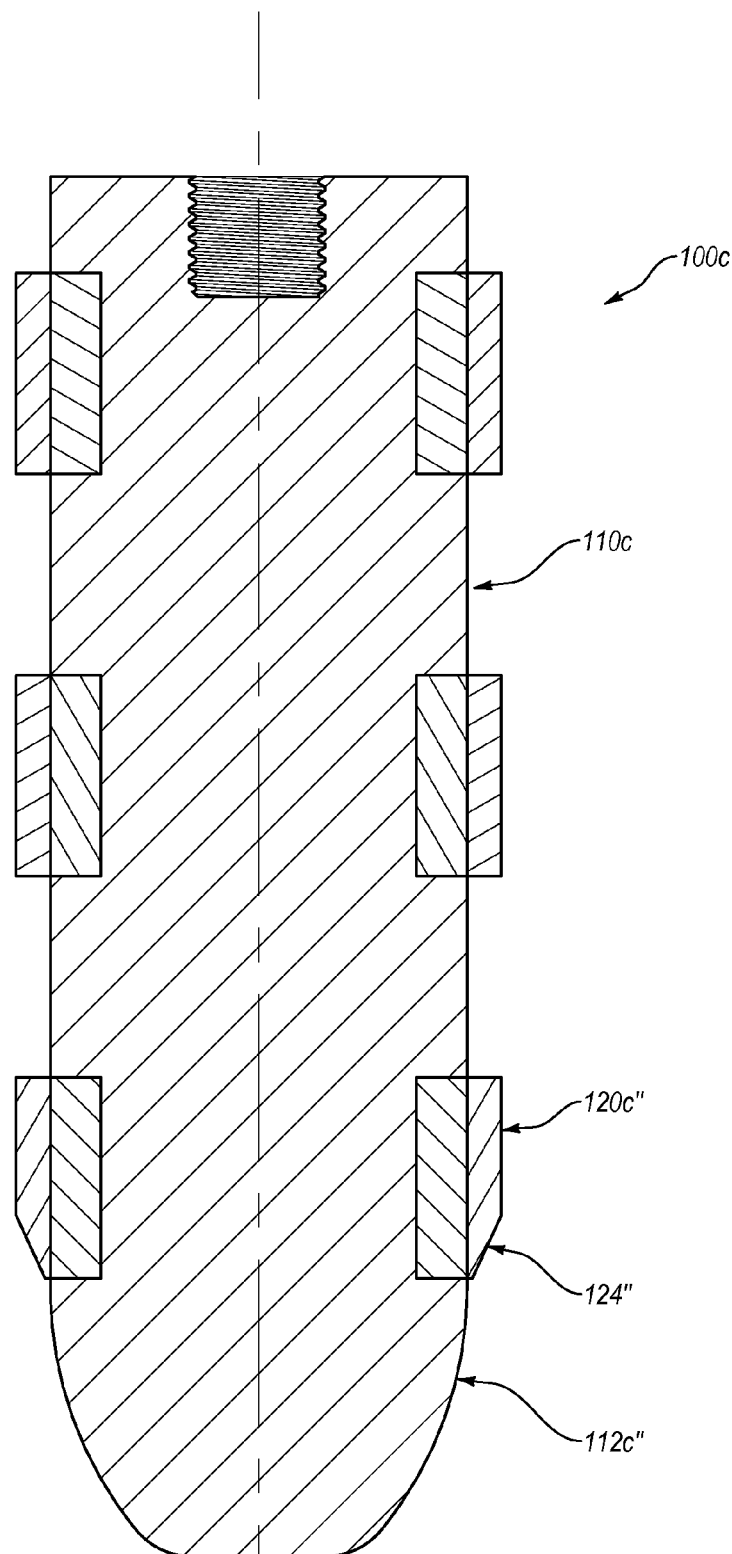
FIG. 3 is a cross-sectional view of first bearing assembly according to another embodiment of the invention.

Furthermore, the tapered section of the first bearing assembly may have other suitable configurations, which may facilitate assembly and operation of the first bearing assembly and another bearing assembly. For example, FIG. 3 illustrates a first bearing assembly 100c, which has a support structure 110c that include a bullet-nosed section 112c". Except as otherwise described herein, the first bearing assembly 100c and its respective materials, elements, or components may be similar to or the same as any of the first bearing assemblies 100, 100a, 100b (FIGS. 1A-1C, 2) and their respective materials, elements, and components.

In some embodiments, the bullet-nosed section 112c" may extend approximately from superhard bearing elements 120c" and toward the end of the support structure 110c. More specifically, in at least one example, the bullet-nosed section 112c" may start near beveled surfaces 124c" of the superhard bearing elements 120c". Moreover, a portion of the bullet-nosed section 112c" may be configured in a manner that an imaginary extension from the beveled surfaces 124c" is tangent to the bullet-nosed section 112c" along the length thereof. In any event, the bullet-nosed section 112c" and/or the beveled surfaces 124c" may facilitate assembly and/or operation of the first bearing assembly 100c and another bearing assembly, such as a second bearing assembly, as described herein.

Also, as illustrated in FIG. 4, an embodiment may include a first bearing assembly 200 that has a support structure 210 and a plurality of superhard bearing elements 220 (e.g., superhard bearing elements 220a-220c) positioned about and an axis of rotation, such as an axis 10a. Except as otherwise described herein, the first bearing assembly 200 and its respective materials, elements, or components may be similar to or the same as any of the first bearing assemblies 100, 100a, 100b, 100c (FIGS. 1A-1C, 2, 3) and their respective materials, elements, and components. For example, the support structure 210 may include a bearing section 211 and a tapered section 212 connected to or integrated with the bearing section 211, which may be similar to the bearing section 111 and tapered section 112 (FIGS. 1A-1D), respectively. In some embodiments, the first bearing assembly 200 may include one or more superhard bearing elements 220 located at and secured to the tapered section 212 of the support structure 210.

In an embodiment, the superhard bearing elements 220c may be secured to and/or within the tapered section 212 of the support structure 210. For instance, a beveled surface 224c of the superhard bearing elements 220c may be substantially concentric with and aligned with an imaginary extension of the tapered section 212. In one embodiment, the beveled surface 224c may be substantially concentric with but larger than outer surface of the tapered section 212. Optionally, the beveled surface 224c may define the tapered section of the first bearing assembly 200. As such, some embodiments may include the tapered section formed entirely by the superhard bearing elements 220c, and optionally solely by the beveled surface 224c thereof.

Furthermore, the superhard bearing elements 220c may include a bearing surface 221c, which may be substantially parallel to and/or in plane with the bearing surfaces of the superhard bearing elements 220a, superhard bearing elements 220b. One example, area of the bearing surface 221c may be smaller than the area of beveled surface 224c. That is, the surface area of the beveled surface 224c may be smaller than the surface area of the bearing surface 221c. In addition, the length of the beveled surface 224c may be greater than the length of the bearing surface 221c, as measured along a longitudinal direction of the bearing surface 221c (i.e., along the direction corresponding to the angle of the tapered section 212). Moreover, the bearing surface 221c may form an obtuse angle φ relative to beveled surface 224c.

Also, in one embodiment, the superhard bearing elements 220c may include a thicker superhard table than the superhard bearing elements 220a and/or 220b. In some embodiments, the thickness of the superhard table of the superhard bearing element 220c may vary depending on the angle of the tapered section 212 (e.g., to allow the bearing surface 221c to align with the bearing surfaces 221a, 221b, while maintaining the beveled surface 224c substantially aligned with the conical tapered section 212 of the support structure 110). For instance, increasing the included angle of the tapered section 212 may require an increased thickness of superhard table to allow the superhard bearing element 220c to have the bearing surface 221c aligned with the bearing surface of the superhard bearing elements 220a and/or 220b.

Figure 5:
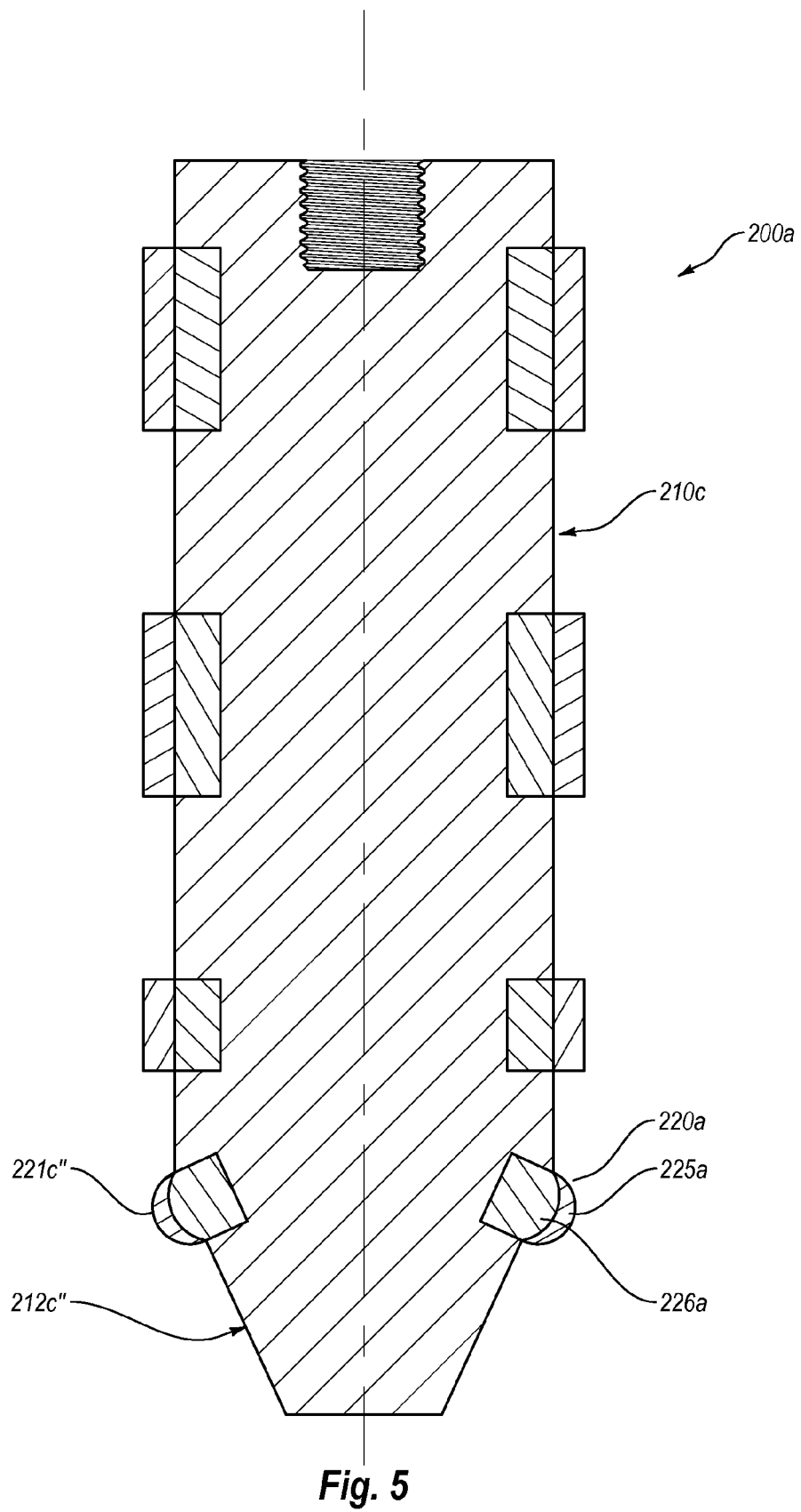
FIG. 5 is a cross-sectional view of first bearing assembly according to still another embodiment of the invention.

Embodiments also may include hemispherical, semispherical, or generally domed bearing elements mounted on the support structure of the bearing assembly. FIG. 5 illustrates a first bearing assembly 200a that includes superhard bearing elements 220a. Except as otherwise described herein, the first bearing assembly 200a and its respective materials, elements, or components may be similar to or the same as any of the first bearing assemblies 100, 100a, 100b, 100c, 200 (FIGS. 1A-1C, 2-4) and their respective materials, elements, and components. For example, the first bearing assembly 200a may include a support structure 210a that may be similar to or the same as the support structure 110 of the first bearing assembly 100 (FIGS. 1A-1B).

As noted above, the superhard bearing elements 220a may have generally domed bearing surfaces 221a. Alternatively, examples of domed surfaces include semispherical, hemispherical, generally arcuate or nonplanar bearing surface or multiple bearing surfaces that may collectively form or define a dome. In any event, the superhard bearing elements 220a may be configured in a manner that facilitates assembly and/or operation of the first bearing assembly 100c and another bearing assembly, such as a second bearing assembly as described herein.

In some instances, the superhard bearing elements 220a may be located on a tapered section 212a of the support structure 220a. Moreover, in some embodiments, the superhard bearing elements 220a may include a superhard table 225a bonded to a substrate 226a. For example, the substrate 226a may be oriented at an approximately 90 degree angle relative to a tangent line extending along the tapered section 212a. In other words, at least in one cross-section, the domed bearing surface 221a may be symmetrical relative to the line of the tapered section 212a (in that cross-section). It should be appreciated, however, that the dome-shaped superhard bearing elements 220a may be positioned at any suitable location on the support structure 210a in a manner that facilitates assembly of the first bearing assembly 200a and an opposing bearing assembly, such as the second bearing assembly.

Figure 6:
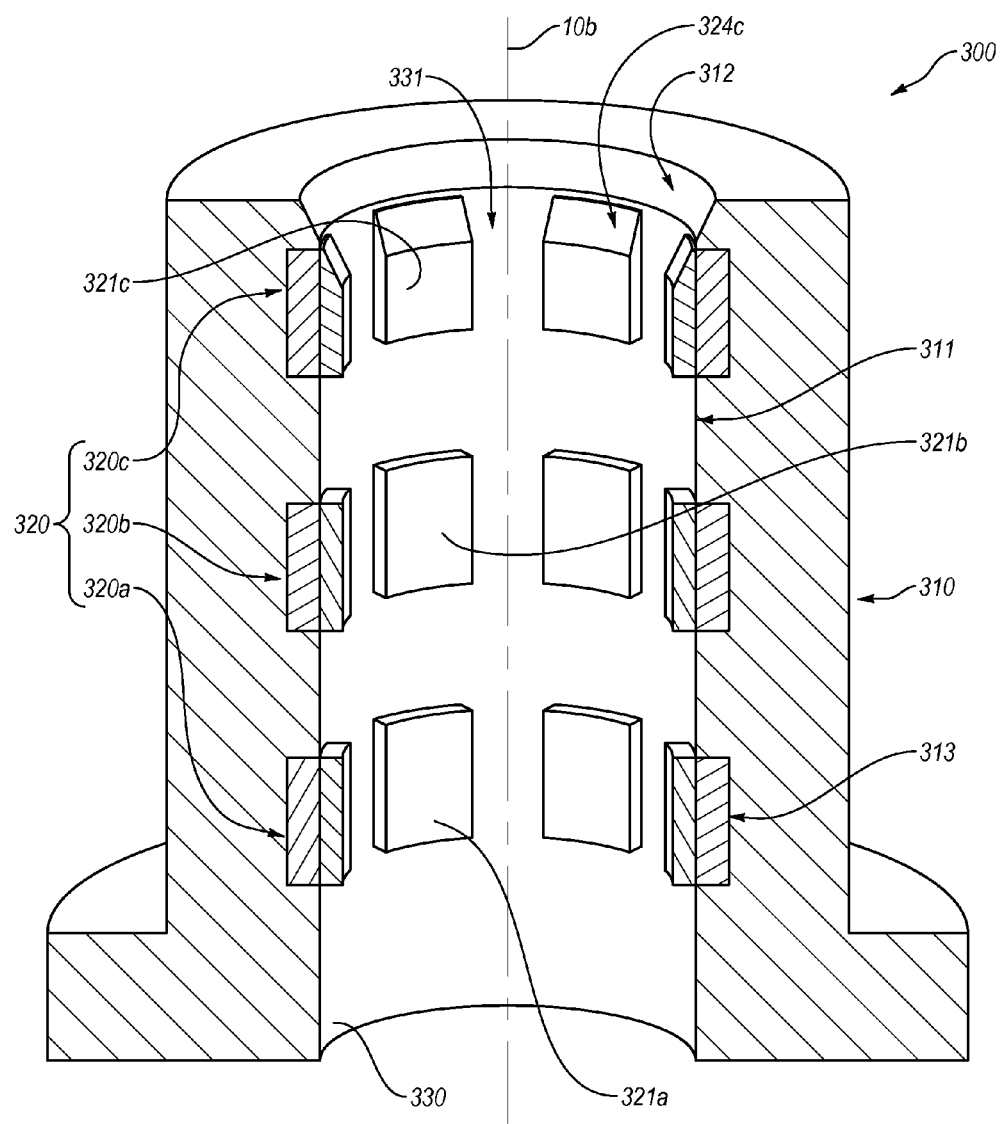
FIG. 6 is a cross-sectional view of a second bearing assembly according to an embodiment of the invention.

In other embodiments, a concave radial bearing assembly with a tapered section is contemplated. For example, a bearing assembly 300 is illustrated in FIG. 6. Except as otherwise described herein, the second bearing assembly 300 and its materials, elements, or components may be similar to or the same as any of the first bearing assemblies 100, 100a, 100b, 100c, 200, 200a (FIGS. 1A-5) and their respective materials elements and components. For instance, the second bearing assembly 300 may include a support structure 310 and a plurality of superhard bearing elements 320 secured to and/or within the support structure 310. More specifically, embodiments may include recesses 313 within the support structure 310, which may secure the superhard bearing elements 320 therein. It should be appreciated, however, that the superhard bearing elements 320 may be attached to the support structure 310 in any number of suitable ways, which may include securing the superhard bearing elements 320 to an inner surface 330 of the support structure 310.

Particularly, the second bearing assembly 300 may include an opening 331 that may be, at least in part, defined by the inner surface 330. Furthermore, the superhard bearing elements 320 may have corresponding bearing surface 321a-321c which may rotatably engage the bearing surfaces of the first bearing assembly, as described above. Specifically, each of the bearing surfaces 321a-321c may have a concave shape that may correspond with the convex shape of the bearing surfaces of the first bearing assembly, thereby allowing the second bearing assembly 300 and the first bearing assembly to rotate relative to each other. In some instances, the second bearing assembly 300 may be a stator, which may be secured to a nonmoving or nonrotating element or component of a machine (e.g., a housing). Alternatively, the second bearing assembly 300 may be a rotor. In any event, the second bearing assembly 300 and the first bearing assembly may rotate relative to each other about an axis of rotation 10b.

The second bearing assembly 300 also may include a tapered section 312. For example, each of the superhard bearing elements 320c may include a beveled surface 324c that may at least partially form or define the tapered section 312. Moreover, in an embodiment, the support structure 310 may include a bearing section 311 and a tapered section 312. In one embodiment, the tapered section 312 may generally have a shape of an imaginary conical surface.

In some embodiments, the beveled surface 324c may be approximately aligned with the tapered section 312. For instance, the beveled surface 324c may lie substantially on an imaginary extension of the surface of the tapered section 312. In some embodiments, the tapered section 312 may include an axial gap between the beveled surface 324c and the tapered section 312, while having the beveled surface 324c and tapered section 312 aligned with one another. Alternatively, the tapered section 312 may have a substantially uninterrupted or continuous surface. In other words, the beveled surface 324c and the tapered section 312 may have no gap therebetween. In any event, the tapered section 312 may facilitate entry of another bearing assembly (whether it has a tapered section or not) into the opening 331 in a manner that avoids or limits damaging the second bearing assembly 300 and/or another bearing assembly.

Figure 7A:
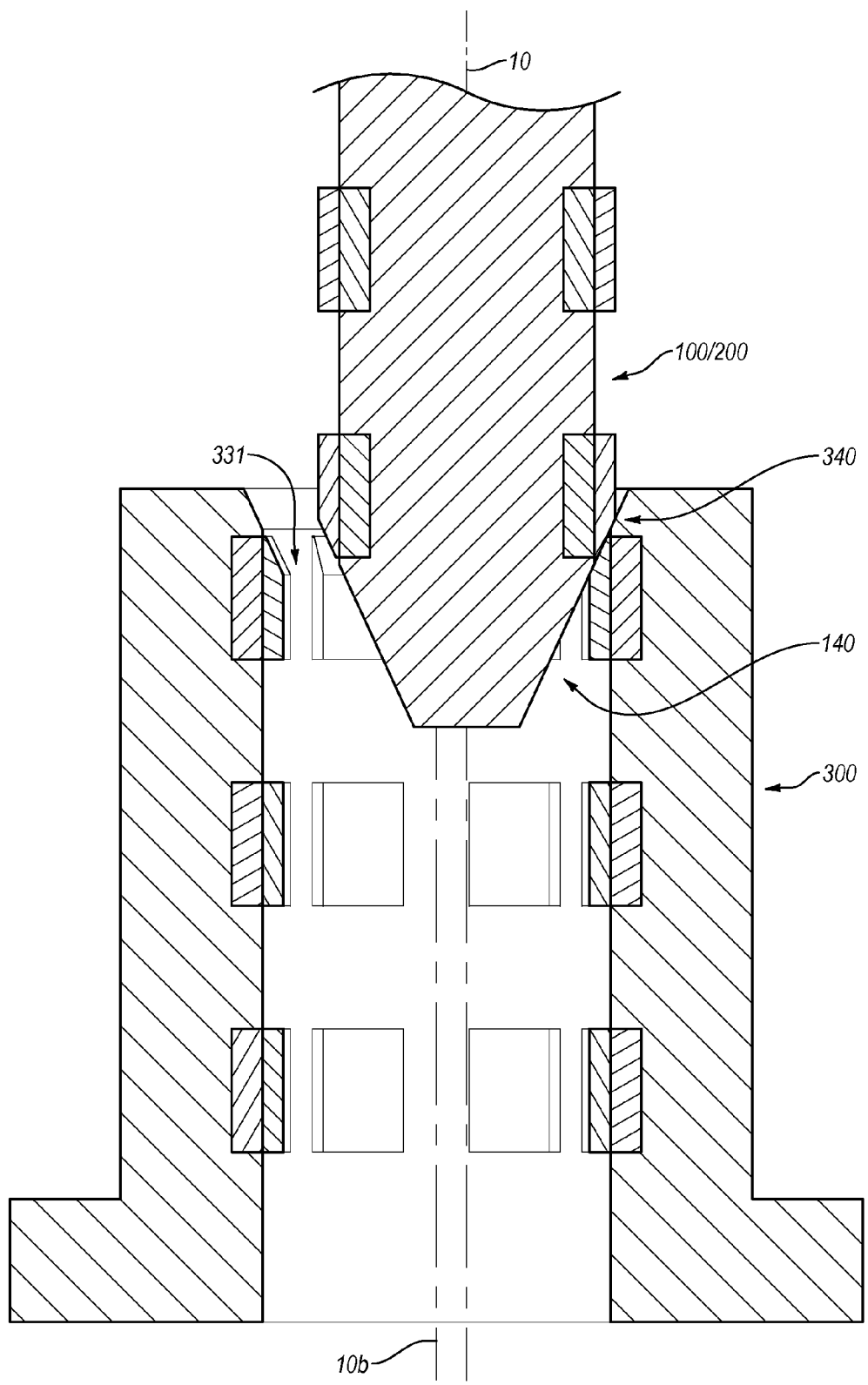
FIG. 7A is a cross-sectional view of misaligned first and second bearing assemblies during assembly of a bearing apparatus according to an embodiment of the invention.

For instance, as the first bearing 100 is positioned within the opening 331 of the second bearing assembly 300, the rotational axes 10 and 10b thereof, respectively, may be misaligned relative to each other, as illustrated in FIG. 7A. It should be appreciated that, although the following description refers to the first bearing assembly 100, any of the first bearing assemblies 100, 200 or other bearing assemblies may be assembled together with the second bearing assembly 300. As the first bearing assembly 100 enters the opening 331 of the second bearing assembly 300, at least a portion of the tapered section 312 may contact at least a portion of the lead-in or tapered section 112, such that the first bearing assembly 100 may move or relocate toward the center axis 10b of the second bearing assembly 300.

Figure 7B:
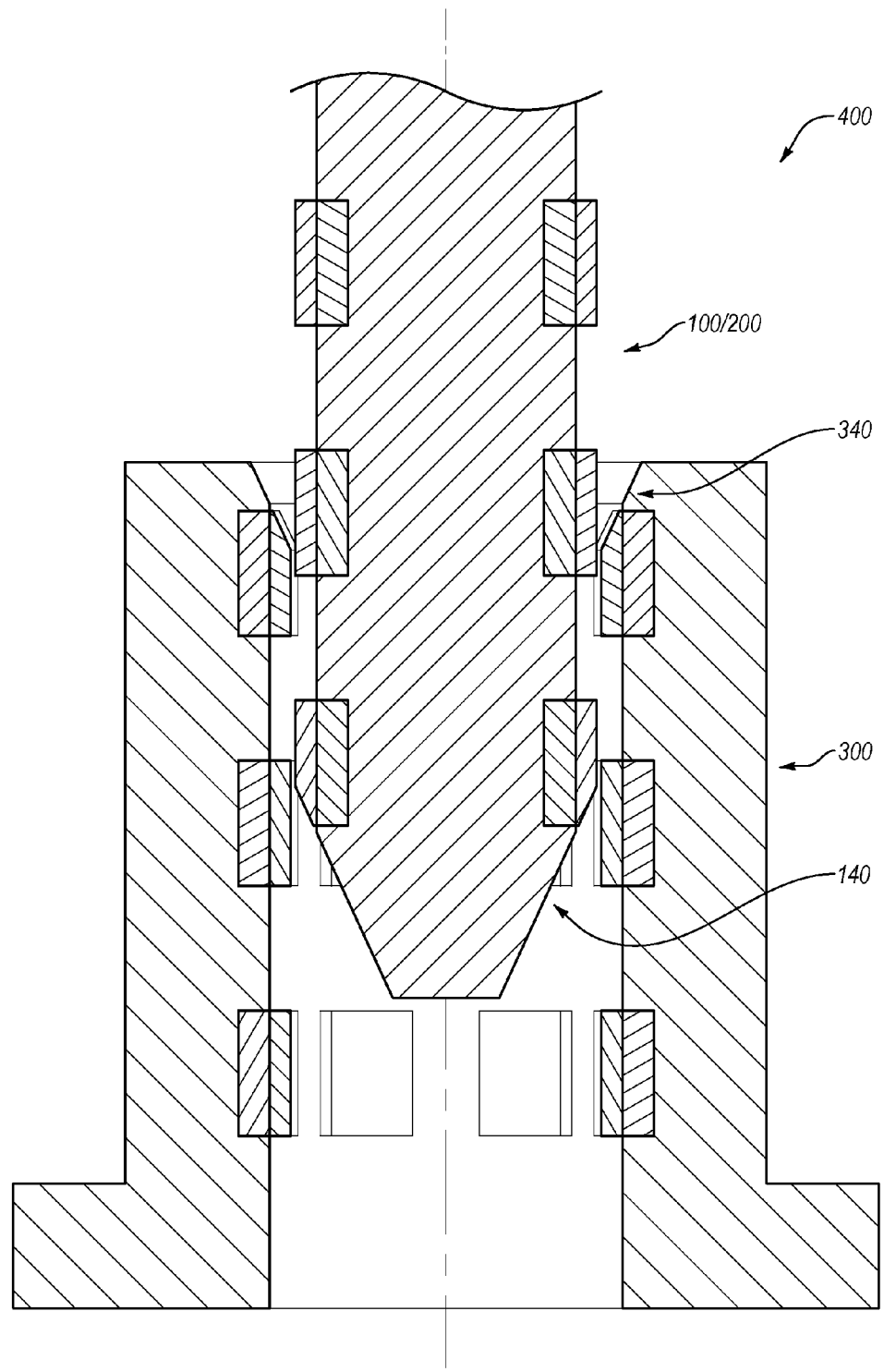
FIG. 7B is a cross-sectional view of substantially aligned first and second bearing assemblies during assembly of a bearing apparatus according to an embodiment of the invention.

In other words, the tapered section 112 and tapered section 312 may facilitate the first bearing assembly 100 and second bearing assembly 300 to become centered relative to each other, such that the respective axes 10 and 10b thereof are substantially aligned with one another, as illustrated in FIG. 7B. Accordingly, the first bearing assembly 100 and the second bearing assembly 300 may be assembled together to form a bearing apparatus 400, without damaging the first bearing assembly 100 and/or the second bearing assembly 300 as well as elements and or components thereof. Furthermore, the tapered section 112 and tapered section 312 may facilitate repeated disassembly and reassembly of the bearing apparatus 400 while reducing damaging or breaking the first bearing assembly 100 and/or the second bearing assembly 300 or their respective elements and components.

As mentioned above, in some embodiments, the bearing surfaces of the first bearing assembly 100 may lie in or along an approximately cylindrical imaginary surface. Such imaginary surface may have any suitable diameter (i.e., the outside diameter of the first bearing assembly 100), which may vary from one embodiment to the next. In one example, such imaginary surface may have a diameter of approximate 4.0 inches. One should appreciate, however, that the diameter of such imaginary surface may be in one or more of the following ranges: between about 1.0 inches and about 2.0 inches; between about 1.5 inches and about 3.0 inches, between 2.8 inches and about 4.5 inches; and between about 4.0 inches and about 8.0 inches. In other examples, the diameter of the imaginary surface may be greater than 8.0 inches or less than 1.0 inches.

Similarly, as described above, the bearing surfaces of the second bearing assembly 300 may lie on or along an imaginary surface that has an approximately cylindrical shape (i.e., a shape approximating an inside of diameter of a tube). Such surface may have a diameter, which defines the inside diameter of the second bearing assembly 300, and which generally corresponds with the outside diameter of the first bearing assembly 100. For instance, the bearing apparatus 400 may include a clearance between the inside diameter of the second bearing assembly 300 and the outside diameter of the first bearing assembly 100 that may facilitate relative rotation of the first and second bearing assemblies 100, 300. The clearance may vary from one embodiment to the next and may depend, among other things, on the diameter of the first and/or second bearing assembly 100, 300.

In an embodiment, the total clearance (i.e., the difference between the inside and outside diameters of the first and second bearing assemblies 100, 300) may be approximately 0.5% to about 1% of the outside diameter of the first bearing assembly 100. For example, the first bearing assembly 100 may have an outside diameter of approximately 4.00 inches, while the inside diameter of the second bearing assembly 300 may be approximately 4.02 inches, thereby forming a clearance of about 0.02 inches between the first and second bearing assemblies 100, 300. In any event, the clearance between the first and second bearing assemblies 100, 300 may be sufficient to facilitate assembly of the bearing apparatus 400 as well as relative rotation of the first and second bearing assemblies 100, 300. Such a configuration may reduce binding or damaging the bearing surfaces thereof during use.

Generally, rotational speeds of the first and/or second bearing assemblies 100, 300 may vary from one embodiment to the next. For example, the first bearing assembly 100 may rotate at approximately 20 RPM to 100 RPM (e.g., about 20 RPM, about 30 RPM, or about 50 RPM), while the second bearing assembly 300 may be stationary relative to a machine component or element, as described below.

Figure 8:
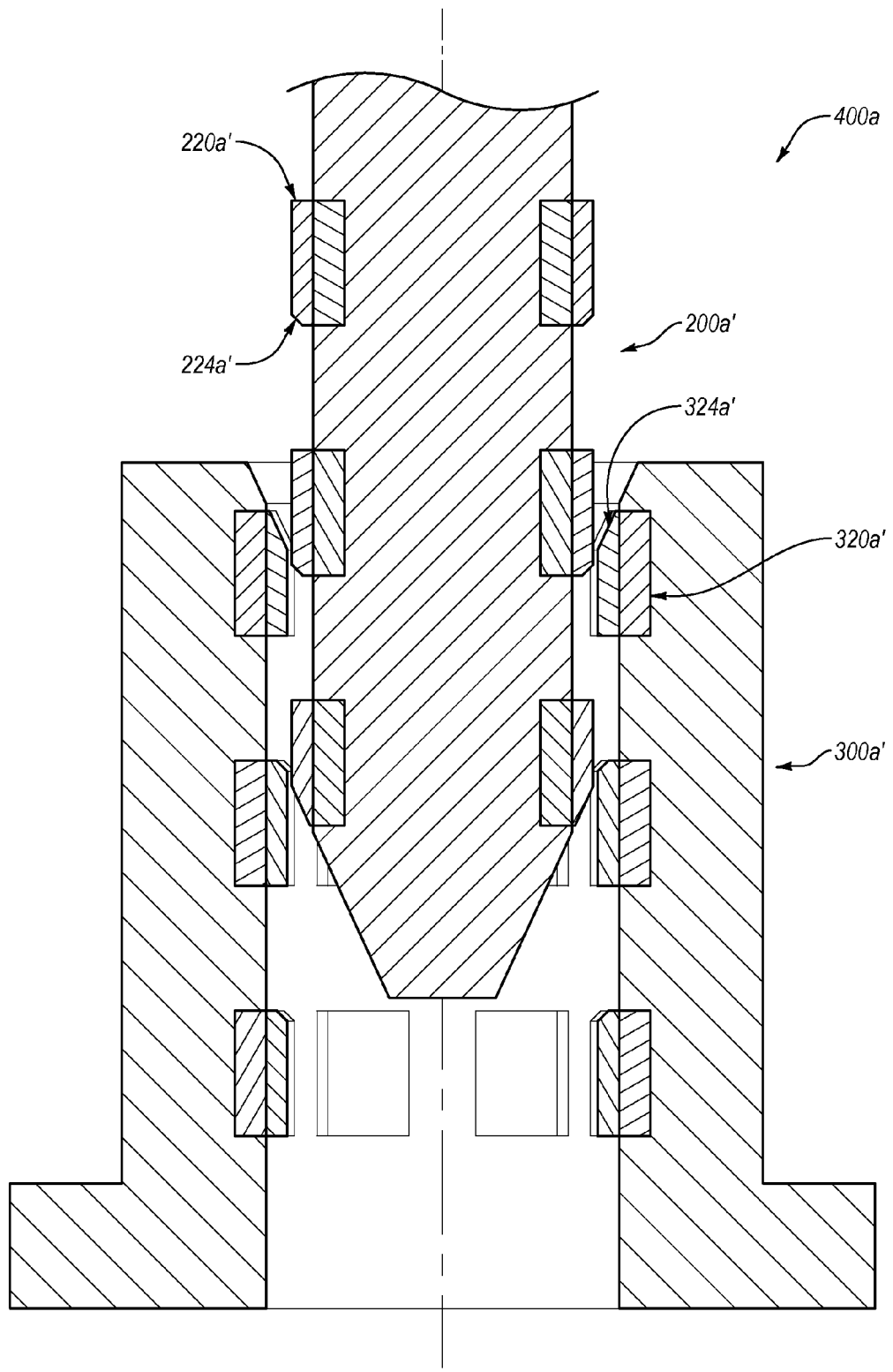
FIG. 8 is a cross-sectional view of a bearing apparatus according to another embodiment of the invention.

It should be appreciated that in some embodiments, the second bearing assembly may include beveled surfaces on bearing elements in other rows (i.e., in addition to the top row of the bearing elements. Similarly, the first bearing assembly may include beveled surfaces on the bearing elements located in rows other than the bottom or lowermost row. For example, FIG. 8 illustrates a bearing apparatus 400a that includes a first bearing assembly 200a' and a second bearing assembly 300a'. Except as otherwise described herein, the first bearing assembly 200a' and/or the second bearing assembly 300a' and their respective materials, elements, or components may be similar to or the same as any of the first bearing assemblies 100, 100a, 100b, 100c, 200, 200a, 300 (FIGS. 1A-7) and their respective materials, elements, and components.

In at least one embodiment, all superhard bearing elements 220b' of the first bearing assembly 200a' may include beveled surfaces 224b'. Likewise, all superhard bearing elements 320a' of the second bearing assembly 300a may include beveled surfaces 324a'. As such, beveled surfaces 224a' and/or 324a' may facilitate entry of the first bearing assembly 200a' into the second bearing assembly 300a'. Moreover, as the first bearing assembly 200a' enters the second bearing assembly 300a', the beveled surfaces 224a' and/or 324a' may reduce or eliminate chipping cracking of the superhard bearing elements 220a' and/or 320a' that may otherwise occur if the superhard bearing elements 220a' and 320a' contact one another at a sharp corner or edge.

It should be also appreciated that embodiments may include any suitable number of rows of bearing elements, some of which may include beveled surfaces. Furthermore, one, some, or all of the bearing in such rows may be superhard bearing elements, which may include diamond bearing surfaces. Also, each row may include any suitable number of bearing elements (e.g., one, two, three, etc.), which may vary from one embodiment to the next and may depend, among other things, on the size of the bearing assembly and bearing apparatus.

Figure 9:
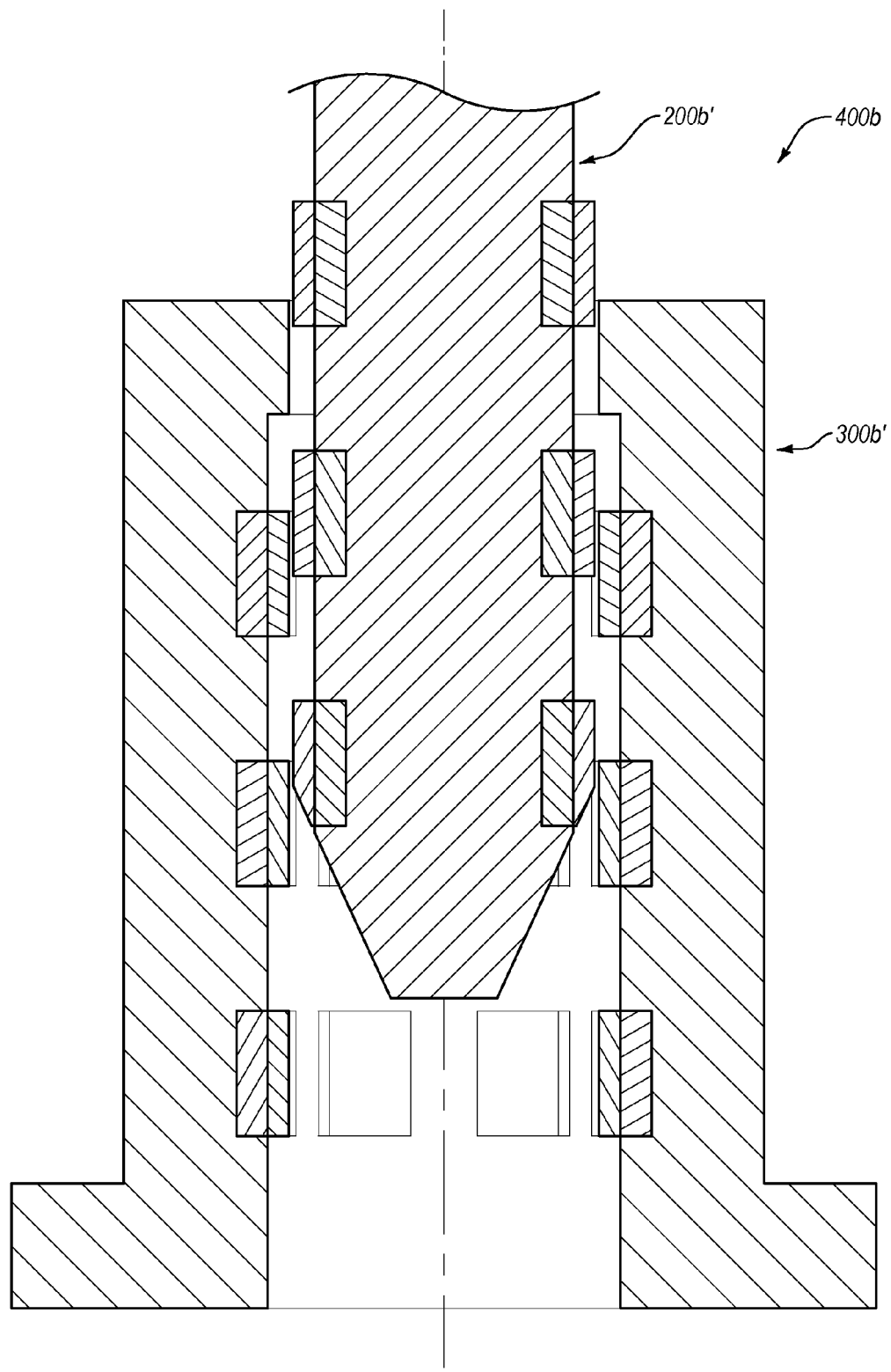
FIG. 9 is a cross-sectional view of a bearing apparatus according to yet another embodiment of the invention.

Embodiments also may include a second bearing assembly that has a relieved entry section to facilitate assembly and/or operation of the bearing apparatus. FIG. 9 illustrates a bearing apparatus 400b that include a first bearing assembly 200b' and a second bearing assembly 300b'. Except as otherwise described herein, the first bearing assembly 200b' and/or the second bearing assembly 300b' and their respective materials, elements, or components may be similar to or the same as any of the first bearing assemblies 100, 100a, 100b, 100c, 200, 200a, 200a', 300, 300a, 300a' (FIGS. 1A-8) and their respective materials, elements, and components. In particular, in at least one instance, the bearing assembly 300b' may include an entry region 310b' that may have an inside diameter that is 1% to 20% smaller (e.g., 5%, 10%, or 15%) than that outside diameter of the imaginary cylinder formed by the bearing surfaces of the superhard bearing elements of the first bearing assembly 200b'.

Figure 10:
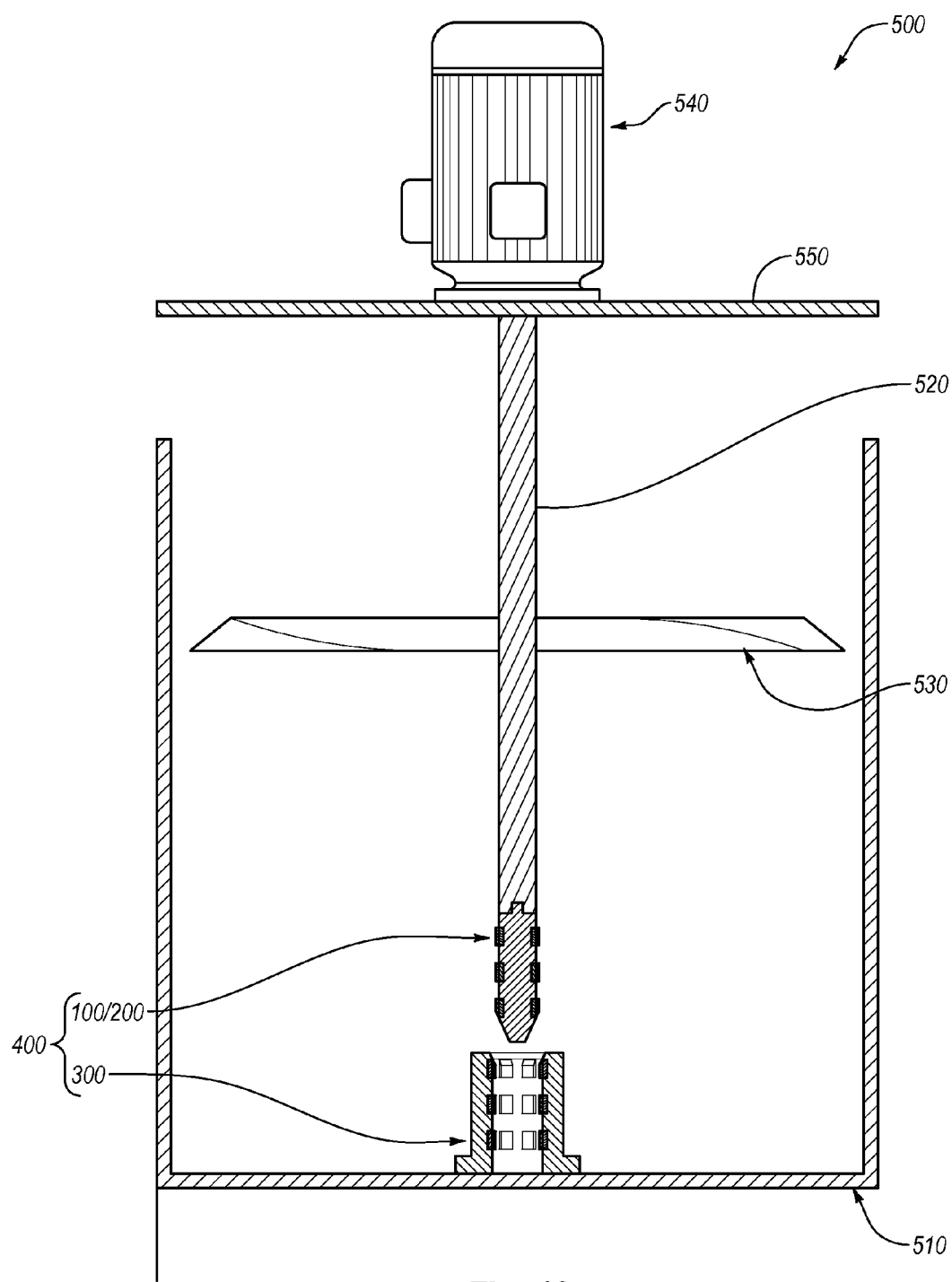
FIG. 10 is a cross-sectional view of an agitator system according to an embodiment of the invention.

In an embodiment, as illustrated in FIG. 10, the bearing apparatus 400 may be incorporated into an agitator system 500. In an embodiment, the second bearing assembly 300 may be secured to a bottom of an agitator container 510. It should be appreciated that the container 510 may be configured to contain any suitable matter or medium, such as liquid, gas, and/or solid matter. Furthermore, in some embodiments, the container 510 may be substantially leak-proof, such as to maintain the matter located therein without any significant leakage. Also, any of the first bearing assemblies 100, 200 may be secured to a shaft 520. In some instances, one or more blades 530 also may be attached to the shaft 520 or incorporated therewith. In addition, a motor 540 may be connected to the shaft 520 and may rotate the shaft 520 together with the blades 530 (e.g., inside the container 510). For instance, rotation of the blades 530 may stir or agitate contents or medium located inside the container 510. In some embodiments, the agitator system 500 also may include a cover 550, which may at least partially enclose contents within the container 510.

Hence, for instance, the first bearing assembly 100 may be inserted into the second bearing assembly 300, in a manner described above. Sometimes, adding and/or removing contents to/from the container 510 may involve removing the shaft 520 from the container and, thus, disassembling the bearing apparatus 400, by removing the first bearing assembly 100 from the second bearing assembly 300. Accordingly, the bearing apparatus 400 may be disassembled and reassembled from time to time. As such, the tapered section of the first bearing assembly 100 and/or the second bearing assembly 300 may facilitate damage-free disassembly and reassembly, thereby prolonging useful life of the first bearing assembly 100 and second bearing assembly 300 as well as of the bearing apparatus 400.

In some embodiments, the shaft 520 may be between 15 feet and 30 feet long. Accordingly, a small angular displacement of the center axis of the shaft 520 relative to the center axis of the second bearing assembly 300 may result in a substantial linear displacement. For example, a 0.25° angular misalignment of the center axes of a 15 foot shaft 520 and the second bearing assembly 300 may result in approximately 0.8 inches of linear misalignment between the first and second bearing assemblies 100, 300. Hence, the corresponding lead-in sections of the first and second bearing assemblies 100, 300 may facilitate alignment thereof during assembly of the bearing apparatus 400. Moreover, in some examples, a tapered section of the first and/or second bearing assemblies 100, 300 may facilitate a blind assembly of the bearing apparatus 400, during which the first and second bearing assemblies 100, 300 may be invisible (e.g., obscured or hidden by the contents of the container 500).

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

We claim:

1. A bearing assembly, comprising:
an elongated body defining a longitudinal axis and having a distal end; and
a plurality of first superhard bearing elements each of which is secured to the elongated body and distributed about the longitudinal axis, each of the plurality of first superhard bearing elements including a first superhard bearing surface and a beveled surface extending from the first superhard bearing surface towards the distal end of the elongated body.

2. The bearing assembly of claim 1 wherein each of the beveled surfaces of the plurality of first superhard bearing elements exhibits a convex or concave surface.

3. The bearing assembly of claim 1 wherein the beveled surface and the first superhard bearing surface of each of the plurality of first superhard bearing elements form an obtuse angle relative to each other.

4. The bearing assembly of claim 1 wherein the beveled surfaces form a portion of a substantially conical surface.

5. The bearing assembly of claim 1 wherein at least some of the first superhard bearing elements includes a substrate and a superhard table bonded to the substrate, and the beveled surface of each of the at least some of the first superhard bearing elements pass through at least a portion of the superhard table and through at least a portion of the substrate.

6. The bearing assembly of claim 1 wherein the first superhard bearing surface exhibits an area that is smaller than an area of the beveled surface.

7. The bearing assembly of claim 1 wherein the elongated body includes a tapered section that tapers toward the distal end thereof.

8. The bearing assembly of claim 7 wherein the beveled surface is substantially concentric with and aligned with an imaginary extension of the tapered section.

9. The bearing assembly of claim 7 wherein the tapered section of the elongated body does not include superhard bearing elements.

10. The bearing assembly of claim 7 wherein the plurality of first superhard bearing elements are at least partially located in the tapered section of the elongated body.

11. The bearing assembly of claim 1 wherein the elongated body includes a bearing section, the bearing section including a plurality of second superhard bearing elements secured to the bearing section, the plurality of second superhard bearing elements being distributed about the longitudinal axis to form a radial bearing surface, each of the plurality of second superhard bearing elements including a second superhard bearing surface.

12. The bearing assembly of claim 11 wherein each of the first superhard bearing surfaces includes a first superhard material, and wherein each of the second superhard bearing surfaces includes a second superhard material that is different than the first superhard material.

13. The bearing assembly of claim 1 wherein plurality of first superhard bearing elements are secured to the elongated body by at least one of brazing, press-fitting, threadedly attaching, or fastening with a fastener.

14. A bearing assembly, comprising:
an elongated body defining a longitudinal axis and having a distal end, the elongated body including a tapered section that tapers toward the distal end thereof; and
a plurality of first superhard bearing elements secured to the elongated body and distributed about the longitudinal axis, each of the plurality of first superhard bearing elements including a first superhard bearing surface and a beveled surface extending from the first superhard bearing surface towards the distal end of the elongated body.

15. The bearing assembly of claim 14 wherein each of the beveled surfaces of the plurality of first superhard bearing elements exhibits a convex or concave surface.

16. The bearing assembly of claim 14 wherein the beveled surfaces form a portion of a substantially conical surface.

17. The bearing assembly of claim 14 wherein the plurality of first superhard bearing elements at least partially located in the tapered section of the elongated body.

18. The bearing assembly of claim 14 wherein the elongated body includes a bearing section, the bearing section including a plurality of second superhard bearing elements secured to an exterior surface or an interior surface of the bearing section, the plurality of second superhard bearing elements being distributed about the longitudinal axis to form a radial bearing surface, each of the plurality of second superhard bearing elements including a second superhard bearing surface.

19. A bearing apparatus, comprising:
a stator; and
a rotor;
wherein one of the stator or the rotor includes:
a support structure including an elongated body defining a longitudinal axis and having a distal end; and
a plurality of first superhard bearing elements each of which is secured to the elongated body and distributed about the longitudinal axis, each of the plurality of first superhard bearing elements including a first superhard bearing surface and a first beveled surface extending from the first superhard bearing surface towards the distal end of the elongated body; and wherein the other of the stator or the rotor includes a plurality of second superhard bearing elements each of which includes a second superhard bearing surface sized and positioned to generally oppose the first bearing surfaces of the plurality of first superhard bearing elements.

20. The bearing apparatus of claim 19 wherein each of the second superhard bearing elements includes a second beveled surface extending at an obtuse angle relative to the second superhard bearing surface.

* * * * *